United States Patent [19]

Bandyopadhyay et al.

[11] 4,244,898
[45] Jan. 13, 1981

[54] METHOD OF PREPARING POROUS, RIGID CERAMIC SEPARATORS FOR AN ELECTROCHEMICAL CELL

[75] Inventors: Gautam Bandyopadhyay, Naperville; Joseph T. Dusek, Downers Grove, both of Ill.

[73] Assignee: The United States of America as represented by the United States Department of Energy, Washington, D.C.

[21] Appl. No.: 25,629

[22] Filed: Mar. 30, 1979

[51] Int. Cl.$^3$ .............................................. C04B 21/02
[52] U.S. Cl. ................................. 264/43; 106/40 R; 264/66
[58] Field of Search ...................... 264/44, 66, 56, 42, 264/43, 65, 125; 106/39.5, 40 R

[56] References Cited

U.S. PATENT DOCUMENTS

| | | | |
|---|---|---|---|
| 3,274,310 | 9/1966 | Kohl | 264/66 |
| 3,288,615 | 11/1966 | Estes et al. | 264/66 |
| 3,533,812 | 10/1970 | Cummings et al. | 264/66 |
| 3,764,643 | 10/1973 | Muta et al. | 264/66 |
| 3,767,745 | 10/1973 | Gazza et al. | 264/66 |

OTHER PUBLICATIONS

ANL 77-17 High-Performance Batteries for Stationary Energy Storage & Electric-Vehicle Propulsion, Oct.–Dec. 1976, pp. 1, 5 & 35–37.
ANL 77-75 High-Performance Batteries for Stationary Energy Storage & Electric-Vehicle Propulsion, Jul.–Sep. 1977, pp. 1, 4–5 & 38–39.
ANL 78-45 High Performance Batteries for Stationary Energy Storage and Electric-Vehicle Propulsion Jan.–Mar. 1978, pp. 1, 4 & 43–46.
ANL 78-94 High-Performance Batteries for Electric-Vehicle Propulsion and Stationary Energy Storage Oct. 1977–Sep. 1978, pp. 1, 6–7 & 150–154.

*Primary Examiner*—Donald J. Arnold
*Attorney, Agent, or Firm*—James E. Denny; Frank H. Jackson; Hugh W. Glenn

[57] ABSTRACT

Porous, rigid separators for electrochemical cells are prepared by first calcining particles of ceramic material at temperatures above about 1200° C. for a sufficient period of time to reduce the sinterability of the particles. A ceramic powder that has not been calcined is blended with the original powder to control the porosity of the completed separator. The ceramic blend is then pressed into a sheet of the desired shape and sintered at a temperature somewhat lower than the calcination temperature. Separator sheets of about 1 to 2.5 mm thickness and 30 to 70% porosity can be prepared by this technique. Ceramics such as yttria, magnesium oxide and magnesium-aluminum oxide have advantageously been used to form separators by this method.

12 Claims, No Drawings

METHOD OF PREPARING POROUS, RIGID CERAMIC SEPARATORS FOR AN ELECTROCHEMICAL CELL

CONTRACTUAL ORIGIN OF THE INVENTION

The invention described herein was made in the course of, or under, a contract with the UNITED STATES DEPARTMENT OF ENERGY.

BACKGROUND OF THE INVENTION

The present invention relates to the preparation of electrically insulative separators for disposing between the electrodes of an electrochemical cell. It is particularly applicable to the new generation of electrochemical cells that operate at high temperatures with molten salt electrolytes and other highly corrosive and reactive materials. For instance these separators are applicable for use in the alkali-metal, metal-sulfide cells.

Both porous rigid sheets and porous flexible fabrics of high-temperature and chemically inert ceramic materials have been considered for separator use. Ceramics such as BN, $Y_2O_3$, MgO, $MgAl_2O_4$, $CaZrO_3$, $Li_2ZrO_3$, $LiAlO_2$, $Si_3N_4$ and AlN have been suggested for use in the corrosive high-temperature environment of the high-energy electrochemical cells. However many of these materials are difficult to fabricate into cloths, felts or other fabrics and their use as a separator material has been limited to the porous rigid sheets or merely to layers of ceramic powder. Materials such as boron nitride and yttria can be made into flexible fabrics, felts or cloths but these materials and the processes for their fabrication contribute significantly to the cost of a cell.

The porous rigid sheets can be prepared from most of the ceramic materials including those such as magnesium oxide which are moderately priced. Straight forward procedures involving pressing and sintering steps are used. However, separators formed by these techniques have been found to be frangible, of insufficient porosity and often warped with inconsistent thickness. These problems along with the requirements for chemical and mechanical stability in the corrosive environment of the high-temperature, molten salt batteries have made it difficult to prepare a suitable separator in a porous, rigid ceramic form.

PRIOR ART STATEMENT

The following publications are related to but do not disclose or teach the present invention.

AI-76-26, Atomics International Development of Lithium-Metal Sulfide Batteries for Load Leveling, Progress Report for June 1, 1974–June 30, 1975, pages 59–75. This report suggests various ceramic materials such as yttria, magnesium oxide and magnesium-aluminum oxide in rigid, porous separators for use in electrochemical cells. However, the present method for obtaining high porosity and avoiding distortion is not shown.

Battles et al., U.S. Pat. No. 3,919,742, "Interelectrode Separator for Electrochemical Cell", Oct. 28, 1975, describes the use of a porous, boron nitride fabric as an interelectrode separator.

Walker, U.S. Pat. No. 4,057,678, Nov. 8, 1977, "Molten Salt Battery Having Inorganic Paper Separator", discloses an electrochemical cell with a porous sheet of ceramic material including a minor proportion of crysotile asbestos fibers. A process similar to that used in paper making is employed for preparing the separator sheet.

Mathers et al., U.S. Pat. No. 4,086,396, Apr. 25, 1978, "Electrochemical Cell with Powdered Electrically Insulative Material as a Separator", shows the use of various powdered ceramic materials for an interelectrode separator within a molten salt electrochemical cell.

SUMMARY OF THE INVENTION

In view of the problems associated with prior art separators, it is an object of the present invention to provide a method for preparing porous, rigid ceramic separators for use in high-temperature molten salt electrochemical cells.

It is a further object to provide a method of preparing rigid interelectrode separators of high porosity and good structural integrity in thin sheet form.

It is also an object to provide a method of preparing interelectrode separators that undergo minimal distortion on sintering into a rigid thin sheet.

It is likewise an object to provide a method of preparing interelectrode separators of high porosity but small pore size for retention of particulate active material.

It is a further object to provide a method for preparing interelectrode separators of good structural integrity and strength to permit handling during assembly of cells.

In accordance with the present invention, a porous, rigid ceramic sheet for use as an interelectrode separator in electrochemical cell is prepared by calcining particulate ceramic material at a first temperature to reduce the surface area of the particle by agglomeration to form particles of larger size and thus reduce the sinterability of the material. Additional particulate ceramic material, of about the original particle size, that has not been calcined is blended with the calcined particles and the particulate mixture pressed into a sheet form. The incorporation of the uncalcined powder provides strength prior to the sintering operation, and also provides the necessary sinterability to the pressed sheets. The sheet is sintered at a second temperature below the first temperature to form a rigid, porous interelectrode separator.

In more specific aspects of the invention, the additional ceramic particles that are not calcined are blended into the calcined material in amounts sufficient to provide about 5 to 10% by weight of the total particulate mass. The calcining and sintering steps are carried out at temperatures of about 1200° to 1600° C. with the calcining temperature preferably about 30° to 100° C. higher than the sintering temperature.

DETAILED DESCRIPTION OF THE PREFERRED EMBODIMENT

In one manner of preparing the rigid, porous separators by the method of the present invention, particles of ceramic material are calcined at an elevated temperature below the melting temperature of the ceramic material. This calcining step drives off any moisture or volatiles associated with the powder and also reduces the surface activity of the powder by particle agglomeration so that the tendency to densify and shrink during subsequent sintering operation can be minimized. This tendency to densify at elevated temperatures below the melting temperature is herein termed sinterability.

The calcined particles are blended with additional uncalcined ceramic material of about the original particle size in amounts of about 5 to 10% of total weight and pressed into a thin sheet of the desired separator shape. Mixing with the uncalcined material provides strength to the cold pressed compact prior to sintering and also provides the necessary sinterability to obtain fired sheets of sufficient strength. Organic binders, e.g., 1:3 stearic acid:acryloid, may be added to the powder mixture to enhance the integrity of the cold pressed compact.

The cold press sheet is sintered at an elevated temperature somewhat below the calcination temperature to minimize warpage. The sintering temperature is preferable about 30° to 100° C. lower than the calcination temperature. The temperatures for calcining and for sintering most often are in the range of 1200°–1600° C. These temperatures allow sufficiently rapid mass transport rate so that effective calcination and sintering can be achieved in a reasonable time period (e.g., <24 h at temperatures for calcination or sintering step). By this process, the shrinkage can be kept to a minimum and thus flat and porous sheet can be obtained.

In addition to the above mentioned steps, the following procedures before the sintering process can help to obtain a flat sintered sheet: (1) the corners of the cold pressed sheets can be ground off to eliminate the area with maximum density gradient and thus reduce the tendency to warp in these areas, (2) the sheet can be positioned in the furnace so that uniform heating can be achieved to help avoid the creation of density gradients during sintering, (3) a small uniform load ($\sim 2$ g/cm$^2$) can be placed on the sheets (e.g., by laying a ceramic plate on the sheet surface) to help keep the sheets flat, and (4) a low heating and cooling rate (e.g., 60° C./h) can be used during the sintering process to minimize thermal stresses on the separator sheets. These procedures, along with sintering at temperatures that are 30° to 100° C. lower than the calcination temperature, can produce porous separator sheets that are nearly perfectly flat.

Various ceramic materials can be employed for preparing the interelectrode separators. For example, $Y_2O_3$, $MgO$, $MgAl_2O_4$, $CaZrO_3$, $Li_2ZrO_3$ and $LiAlO_2$ are contemplated. Materials such as $Y_2O_3$ and $MgO$ have been of particular interest during the preparation of the separators by the method of this invention.

The original particles of ceramic material can be provided in several forms. The simplest and preferred form is commercially available ceramic oxide powder (e.g., $Y_2O_3$ or $MgO$) with particle sizes of about 0.5 to 5 microns. Alternatively, the original material can be a compound or in a form which on calcination decomposes to the desired oxides. For example, for fabrication of $Y_2O_3$ separators, instead of using pure $Y_2O_3$, $Y_2O_3$-nitric acid plasters or $Y_2O_3$ foam can be used as the starting material. The nature of the starting material may advantageously influence the pore morphology of the final sintered sheets.

Through use of the procedures described herein, separators of $\sim 1.5$ to 2.5 mm thickness and porosities in excess of 60% have been pepared. These separators have exhibited good structural integrity to permit handling by workers or apparatus in the assembly of electrochemical cells. One of the attractive properties of these rigid separators is the particle retention capacity which arises from the extremely small pore sizes (average diameter 0.5–0.8 $\mu$m) that are detected in the sintered sheets.

Separators of the type described are suitable for use in a large number of high-temperature electrochemical cells that employ molten salt electrolytes. Cells of the type contemplated are described in a number of publications including the patents cited above in the Prior Art Statement. Several separators prepared by the method of the present invention have been tested in cells employing LiCl-KCl electrolyte, FeS positive electrodes and LiAl negative electrodes.

The following examples are presented to illustrate methods of preparing interelectrode separators that were subsequently tested in electrochemical cells.

EXAMPLE I (Cell MS-2)

Interelectrode separators were prepared by foaming yttria slurry containing albumin in a dilute nitric acid. After the resulting foam set to form a foamaceous solid, it was calcined at 1550° C. for 13 hours and crushed into macroscopic fragments. The fragments were mixed with about 10 weight percent original yttria powder of about 1 to 5 microns particle size, cold-pressed and sintered at 1450° C. for 6 hours to form two sheets of about 1.5 mm thickness and slightly more than 60% porosity. Two separators as thus formed were assembled on either side of an FeS positive electrode between two LiAl negative electrodes and operated as an electrochemical cell having a theoretical capacity of 50 amp-hours with molten salt electrolyte. The cell operated for 158 cycles, exhibiting FeS utilizations of between 85% to 30% over a current density range of 20 to 100 mA/cm$^2$.

EXAMPLE II (Cell MS-3)

Fine particles of mgO having particle sizes of about <1 to 5 microns were calcined at 1450° C. for 2¾ hours and blended with about 5% total weight of the original MgO powder. The material was cold-pressed into sheets and sintered at 1400° C. for 5 hours to produce two separators of about 1.9 mm thickness and about 40% porosity. When operating an electrochemical cell of about 35 amp-hour capacity with these separators for 65 cycles, utilizations of electrode active material of 54 to 36% were exhibited over current densities of 20 to 60 mA/cm$^2$.

EXAMPLE III (Cell MS-4)

Separators were prepared in a similar manner to that described in Example II except that 6.7 weight percent original powder was combined with the calcined material after calcining for 4 hours. The cold-pressed sheet was sintered at 1420° C. for 3¼ hours to produce separators of 1.7–1.8 mm thickness and porosities of about 34–44%. Two of such separators were assembled in a cell having a theoretical capacity of 50 amp hours and operated for 160 cycles to exhibit utilizations of slightly more than 60% to about 20% at current densities of 20 to 100 mA/cm$^2$, respectively.

The results of operating electrochemical cells with thin-sheet, porous rigid interelectrode separators prepared by the method of the present invention show that high porosity separators with good structural integrity can be prepared. Thin separators of less than 2 mm thickness were prepared with sufficient structural strength to be handled and assembled within electrochemical cells. In each example, the separators retained their integrity during cell operation. The separators were found to have extremely small pores (e.g. average diameter of about 0.5 to 0.8 microns). The small pores permit passage of electrolyte between the electrodes while providing a good barrier to the migration of active electrode particles.

It will therefore be clear that the present invention provides an improved method of preparing porous rigid separator sheets that are sufficiently thin and porous to permit good ionic conductivity within the cell while retaining the active electrode particles thus resulting in good utilization of active material. The rigid thin separator layers also show sufficient structural integrity to facilitate cell assembly but with minimal contribution to cell weight.

It will also be clear that, although the present invention has been described in terms of specific embodiments, various changes in the materials and procedures employed can be made by those skilled in the art within the scope of the accompanying claims.

The embodiments of the invention in which an exclusive property or privilege is claimed are defined as follows:

1. A metod of preparing a porous, rigid ceramic sheet for use as an interelectrode separator in an electrochemical cell comprising:
    calcining particulate ceramic material at a first temperature to agglomerate particles and reduce the ability of the ceramic material to sinter and densify into an integral mass;
    blending additional particulate ceramic material with said calcinced material, said additional material having smaller particle size and greater ability to sinter and densify into an integral mass than said agglomerated calcined material;
    pressing said blend of ceramic material to form a compacted sheet; and
    sintering said compacted sheet at a second temperature below said first temperature to form a rigid, porous separator for use between electrodes in an electrochemical cell.

2. The method of claim 1 wherein said first temperature is about 30° to 100° C. higher than said second temperature and wherein both said first and second temperatures are between about 1200° and 1600° C.

3. The method of claim 1 wherein said ceramic material is selected from the group of metal oxides consisting of $Y_2O_3$, MgO, $MgAl_2O_4$, $CaZrO_3$, $LiaZrO_3$, $LiAlO_2$ and combinations of these oxides.

4. The method of claim 3 wherein said ceramic materials are selected from $Y_2O_3$ and MgO.

5. The method of claim 1 wherein said particles of ceramic material have an average particle size of about 0.5 to 5 microns prior to calcination.

6. The method of claim 1 wherein said additional ceramic particles are of about 0.5 to 5 microns particle size and are blended into said calcined ceramic particles in amounts sufficient to provide about 5 to 10% by weight of the total mass.

7. The method of claim 1 wherein said calcining and sintering are performed at temperatures of about 1200° to 1600° C.

8. The method of claim 1 wherein said blend of ceramic material is pressed into a sheet of about 1 to 2.5 mm thickness and sintered to form a rigid porous sheet of about 30 to 70% porosity.

9. The method of claim 1 wherein said sintering of the compacted sheet is performed with a uniform load bearing upon the major surfaces of the sheet.

10. The method of claim 1 wherein said compacted sheet has rectangular major surfaces and is rounded at each corner to remove portions of high density gradient prior to sintering.

11. A method of preparing a rigid ceramic sheet of 30–70% porosity for use as an interelectrode separator in an electrochemical cell comprising:
    providing particulate ceramic material having average particle size of 0.5 to 5 microns;
    calcining a major portion of said particulate ceramic material at a first temperature to agglomerate particles and reduce the ability of the ceramic material to sinter and densify into an integral mass;
    blending a remaining minor portion of said particulate ceramic material that was not subjected to said calcining step with said calcined agglomerated particles;
    pressing said blend of ceramic material to form a compacted sheet; and
    sintering said compacted sheet at a second temperature below said first temperature to form a rigid porous separator for use between electrodes in an electrochemical cell.

12. The method of claim 11 wherein said remaining minor portion of ceramic material is blended into said calcined ceramic particles in amounts sufficient to provide about 5–10% by weight of the total mass.

* * * * *